United States Patent
Kawashima et al.

(10) Patent No.: US 9,837,692 B2
(45) Date of Patent: Dec. 5, 2017

(54) POWER CONTROLLING APPARATUS

(71) Applicant: MITSUBISHI JIDOSHA KOGYO KABUSHIKI KAISHA, Tokyo (JP)

(72) Inventors: Kazuhito Kawashima, Tokyo (JP); Keisuke Tashiro, Tokyo (JP); Tetsuya Watanabe, Tokyo (JP); Akihito Miyamoto, Tokyo (JP); Ryoji Kato, Tokyo (JP); Chikara Takei, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 324 days.

(21) Appl. No.: 14/418,833

(22) PCT Filed: Mar. 14, 2013

(86) PCT No.: PCT/JP2013/057215
§ 371 (c)(1),
(2) Date: Jan. 30, 2015

(87) PCT Pub. No.: WO2014/050169
PCT Pub. Date: Apr. 3, 2014

(65) Prior Publication Data
US 2015/0295293 A1    Oct. 15, 2015

(30) Foreign Application Priority Data
Sep. 28, 2012   (JP) ................. 2012-216063

(51) Int. Cl.
*H01M 8/04*    (2016.01)
*H01M 16/00*   (2006.01)
(Continued)

(52) U.S. Cl.
CPC .......... *H01M 16/006* (2013.01); *B60L 1/003* (2013.01); *B60L 11/1803* (2013.01);
(Continued)

(58) Field of Classification Search
CPC ...... H01M 16/00; H01M 16/006; H01M 8/04; H01M 8/04656
See application file for complete search history.

(56) References Cited

U.S. PATENT DOCUMENTS

| 7,059,436 B2 | 6/2006 | Iwasaki |
| 2002/0162694 A1 | 11/2002 | Iwasaki |

(Continued)

FOREIGN PATENT DOCUMENTS

| JP | 2002-141073 A | 5/2002 |
| JP | 2007-128773 A | 5/2007 |

(Continued)

OTHER PUBLICATIONS

Extended European Search Report dated Apr. 21, 2016 issued in the corresponding European Patent Application No. 13841998.1.

*Primary Examiner* — Karie O'Neill Apicella
(74) *Attorney, Agent, or Firm* — Birch, Stewart, Kolasch & Birch, LLP

(57) ABSTRACT

A power controlling apparatus includes a secondary battery (2) connected to an electrical device (4), and a fuel cell (3) connected to the electrical device (4) and the secondary battery (2). The fuel cell (3) has two non-generating modes including an idling mode and a halt mode, the fuel cell (3) suspending generation of power while being supplied with fuel in the idling mode, the fuel cell (3) stopping generation of power without fuel supply in the halt mode. The power controlling apparatus further includes a remainder estimator (11) to calculate the remaining number of starts representing the remaining number of available starts of the fuel cell (3), and a controller (16) to control the fuel cell (3) to be one of the two non-generating modes during a non-charging mode of the secondary battery (2), based on the remaining number of starts calculated by the remainder estimator (11).

6 Claims, 2 Drawing Sheets

(51) Int. Cl.
 *H01M 8/04313* (2016.01)
 *H01M 8/04537* (2016.01)
 *B60L 1/00* (2006.01)
 *B60L 11/18* (2006.01)
 *H01M 8/04828* (2016.01)
 *H01M 8/043* (2016.01)

(52) U.S. Cl.
 CPC ....... *B60L 11/1818* (2013.01); *B60L 11/1862* (2013.01); *B60L 11/1874* (2013.01); *B60L 11/1887* (2013.01); *H01M 8/043* (2016.02); *H01M 8/0494* (2013.01); *H01M 8/04313* (2013.01); *H01M 8/04656* (2013.01); *B60L 2210/10* (2013.01); *B60L 2210/30* (2013.01); *B60L 2230/12* (2013.01); *B60L 2240/421* (2013.01); *B60L 2240/80* (2013.01); *B60L 2260/44* (2013.01); *H01M 2220/20* (2013.01); *H01M 2250/20* (2013.01); *Y02T 10/642* (2013.01); *Y02T 10/705* (2013.01); *Y02T 10/7011* (2013.01); *Y02T 10/7044* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/14* (2013.01); *Y02T 90/32* (2013.01); *Y02T 90/34* (2013.01)

(56) References Cited

U.S. PATENT DOCUMENTS

| | | |
|---|---|---|
| 2004/0048118 A1 | 3/2004 | Nakaji et al. |
| 2010/0279192 A1* | 11/2010 | Kawase ............ H01M 8/04388 429/443 |
| 2012/0321977 A1 | 12/2012 | Katou et al. |

FOREIGN PATENT DOCUMENTS

| | | |
|---|---|---|
| JP | 2007-294294 A | 11/2007 |
| JP | 2007-323843 A | 12/2007 |
| JP | 4686842 B2 | 5/2011 |
| WO | WO 2011/102147 A1 | 8/2011 |

* cited by examiner

POWER CONTROLLING APPARATUS

FIELD

The present invention relates to a power controlling apparatus for controlling charge/discharge modes of a secondary battery (rechargable battery) and a fuel cell.

BACKGROUND

Recent studies focus on the application of fuel-cell power generating systems to electric and hybrid vehicles driven by secondary batteries. In specific, in response to significant decreases in the charging rates (states of charge; SOC) of the secondary batteries, the fuel cells generate power for charging the secondary batteries and driving the vehicles to compensate for the power shortage. Such fuel cells functioning as auxiliary power sources can increase the running distances of the vehicles at high fuel efficiency without increased capacities of the secondary batteries (e.g., refer to PTLs 1 and 2).

A typical fuel cell experiences temporary increases in the electrode potential caused by fluctuations in load and the switching between the start and stop of the fuel cell, resulting in deterioration of carriers and catalyst. Such deterioration impairs the performance of the fuel cell and the running performance of the vehicle. Eagerly anticipated is a more durable and reliable fuel cell.

A measure under consideration to solve this problem without deterioration is an improved operation of a fuel cell. For example, PTL 1 discloses control for driving a fuel cell to charge a secondary battery when the charging rate of the secondary battery reaches the lower limit, and controlling the fuel cell to be an idling mode when the charging rate of the secondary battery reaches the upper limit. The prevention of frequent restarts (stops and starts) of the fuel cell can maintain high system efficiency.

CITATION LIST

Patent Literature

PTL 1: Japanese Unexamined Patent Application Publication No. 2002-141073
PTL 2: Japanese Patent No. 4686842

SUMMARY

Technical Problems

Unfortunately, accessories related to the fuel cell consume power during the idling mode of the fuel cell. Accordingly, a non-generating mode of the fuel cell for a longer time leads to decreases in the overall electricity efficiency and the running distance of the vehicle. If the fuel cell is frequently started and stopped to enhance the electricity efficiency, the fuel cell more rapidly deteriorates.

Such a conventional power controlling system including the secondary battery can hardly achieve enhanced energy efficiency without deterioration of the fuel cell.

An object of the invention, which has been accomplished to solve the above problems, is to provide a power controlling apparatus that has increased energy efficiency while ensuring high power-generation efficiency of a fuel cell.

Another object of the invention is to provide advantageous effects that are derived from the individual features described in the Description of Embodiments below but not from conventional techniques.

Solution to Problems (1) A power controlling apparatus disclosed herein includes: a secondary battery connected to an electrical device; and a fuel cell connected to the electrical device and the secondary battery, the fuel cell having two non-generating modes comprising an idling mode and a halt mode, the fuel cell suspending generation of power while being supplied with fuel in the idling mode, the fuel cell stopping generation of power without fuel supply in the halt mode.

The power controlling apparatus further includes: a remainder estimator to calculate a remaining number of starts representing the remaining number of available starts of the fuel cell; and a controller to control the fuel cell to be one of the two non-generating modes during a non-charging mode of the secondary battery, based on the remaining number of starts calculated by the remainder estimator.

The electrical device indicates machinery, apparatus or instruments driven by electricity. The term "remaining number of available starts" indicates the (desired or allowable) number of starts of the fuel cell before the end of its use. The "remaining number" does not necessarily indicate the number before the fuel cell loses the ability of power generation, but may indicate the number before the performance of power generation by the fuel cell deteriorates to the minimum desired level.

For example, if the minimum desired level of the power-generation performance is 80% of that of an unused fuel cell, the remaining number of available starts indicates the number of starts from the current time to the time for the deterioration of the power-generation performance to 80% of that of an unused fuel cell. If the minimum desired level is lower than 80%, the remaining number accordingly increases. The remaining number of available starts is thus appropriately defined depending on the minimum desired level of the power-generation performance.

In plain language, the remaining number of available starts indicates how many times the fuel cell will be started from now to the time for the disposal or replacement of the fuel cell.

(2) The power controlling apparatus preferably further includes a consumption estimator to calculate a power consumption rate in the secondary battery by the electrical device. In this case, the controller preferably selects one of the two non-generating modes based on the remaining number of starts and the power consumption rate.

(3) The consumption estimator preferably calculates the power consumption rate, based on power charged to the secondary battery and power generated by the fuel cell during the charge to the secondary battery, and the controller preferably controls the fuel cell to be one of the two non-generating modes upon completion of the charge to the secondary battery.

(4) The power controlling apparatus preferably further includes a number estimator to estimate the number of starts of the fuel cell available within the remaining time, based on the power consumption rate, the remaining time representing the remaining value of an available operating time in the fuel cell.

In this case, the controller preferably controls the fuel cell to be the idling mode of the two non-generating modes if the estimated number of starts is larger than the remaining number of starts, and the halt mode of the two non-generating modes if the estimated number of starts is equal to or smaller than the remaining number of starts.

The term "remaining value of an available operating time" indicates a (desired or allowable) time for operating the fuel cell until the end of its use. In other words, the "remaining value" indicates a period until the power-generation performance of the fuel cell deteriorates to the minimum desired level, like the "remaining number of available starts."

In plain language, the remaining value of the available operating time indicates how long the fuel cell will run its life until the disposal or replacement of the fuel cell.

(5) The controller preferably maintains the fuel cell in the one of the two non-generating modes until start of the subsequent charge to the secondary battery.

Advantageous Effects

The power controlling apparatus controls the fuel cell to be one of the two non-generating modes based on the estimated value of the remaining number of starts, and thus can achieve enhanced energy efficiency without deterioration of the fuel cell.

BRIEF DESCRIPTION OF DRAWINGS

FIG. 4 is a graph illustrating an estimation technique in a power controlling apparatus according to the embodiment.

DESCRIPTION OF EMBODIMENTS

A power controlling apparatus applied to a vehicle will now be described with reference to the accompanying drawings. The embodiments are mere examples and do not intend to exclude application of various modifications or techniques that are not described in the embodiments. The individual features of the embodiments may be modified in various manners without departing from the gist and/or selectively employed as necessary or properly combined with one another.

1. Configuration of Apparatus

Figure 1:
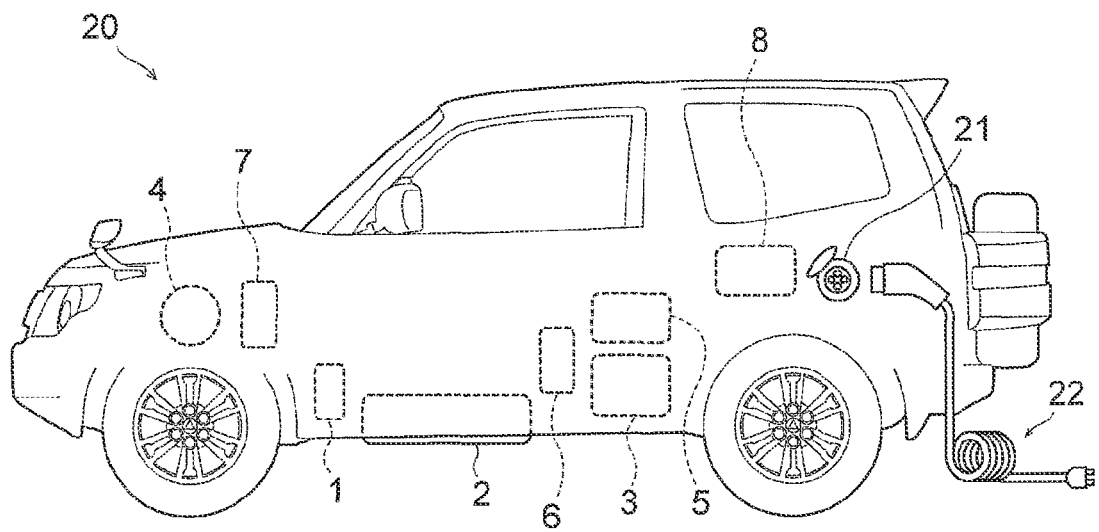
FIG. 1 is a side view of the entire configuration of a vehicle including a power controlling apparatus according to an embodiment.

FIG. 1 illustrates a vehicle 20 including a power controlling apparatus 1 according to the present embodiment. The vehicle 20 is a fuel-cell hybrid vehicle including an electric motor (electrical device) 4, and a secondary battery 2 and a fuel cell 3 for driving the motor 4.

The secondary battery 2 is an electrical storage device chargeable with power regenerated in the vehicle 20, power from the external power source, and power from the fuel cell 3. Examples of the secondary battery 2 include a lithium ion secondary battery and a lithium ion polymer secondary battery. The secondary battery 2 is connected to the motor 4 and the fuel cell 3. The secondary battery 2 supplies power to the motor 4 and various on-board electrical devices.

The fuel cell 3 is a power generating device for generating power by the electrochemical reaction between hydrogen (fuel) and oxygen in the air. Examples of the fuel cell 3 include a polymer electrolyte fuel cell and a phosphoric acid fuel cell. The fuel cell 3 supplies power to the electrical devices such as the motor 4 and charges the secondary battery 2. The fuel (e.g., hydrogen gas or hydrogen-containing gas) for the fuel cell 3 is stored in a fuel tank 5.

The electric circuit connecting the secondary battery 2 and the fuel cell 3 includes a converter (DC/DC converter) 6 for varying the voltage. The converter 6 increases the DC voltage from the fuel cell 3 and supplies the power to the secondary battery 2 and the motor 4. The electric circuit connecting the secondary battery 2 and the motor 4 includes an inverter (DC/AC inverter) 7 for converting DC power into AC power.

The vehicle 20 includes an inlet 21 on an external surface. A charging cable 22 is connected to the inlet 21 for introducing power during the external charging operation. The electric circuit connecting the secondary battery 2 and the inlet 21 includes an on-board charger 8. The on-board charger 8 converts AC power from a domestic power source or charging station outside the vehicle 20 into DC power. The charge/discharge mode of the secondary battery 2 and the operational modes of the fuel cell 3, the motor 4, and the on-board charger 8 are controlled by an electronic control unit 10 (described below).

2. Configuration of Circuit

Figure 2:
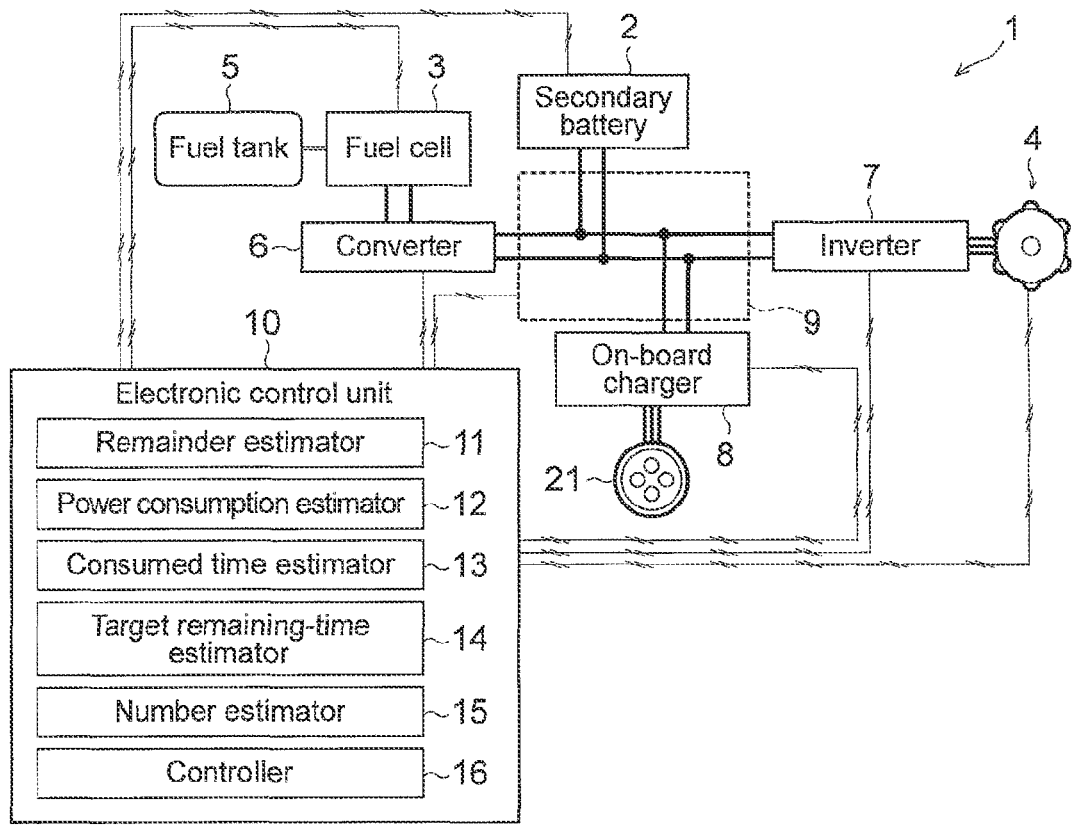
FIG. 2 is a schematic block diagram illustrating the entire configuration of a power controlling apparatus according to the embodiment.

FIG. 2 is a schematic view of circuitry for driving the motor 4. The circuitry is composed of three-phase AC circuits between the motor 4 and the inverter 7 and between the on-board charger 8 and the inlet 21, and a DC circuit in the other portion.

In the DC circuit illustrated in FIG. 2, the secondary battery 2, the converter 6, the inverter 7, and the on-board charger 8 are connected to one another via a control circuit 9. The control circuit 9 comprehensively manages the magnitude and the direction of power transmitted among the devices under the control of the electronic control unit 10.

If the charging rate of the secondary battery 2 decreases to a minimum charging rate $SOC_{MIN}$, the fuel cell 3 starts power generation to drive the motor 4 and charge the secondary battery 2. If the charging rate of the secondary battery 2 increases to a maximum charging rate $SOC_{MAX}$, the fuel cell 3 suspends or stops the power generation.

The fuel cell 3 suspends or stops power generation in two non-generating modes, i.e., an idling mode and a halt mode.

In the idling mode, the fuel cell 3 suspends power generation while being supplied with fuel from the fuel tank 5. Only the power generation by the fuel cell 3 is suspended, whereas related accessories attached to the fuel cell 3, for example, are energized in the idling mode. The idling mode is achieved by the disconnection of a switch in the DC circuit between an electrode of the fuel cell 3 and the converter 6, for example.

In the halt mode, the fuel cell 3 stops power generation without fuel supply thereto. A power source for the related accessories is also disconnected and the power generation of the fuel cell 3 is completely stopped in the halt mode. The two non-generating modes are controlled by the electronic control unit 10 during or after the charge to the secondary battery 2.

The electronic control unit 10 is composed of, for example, an LSI device or embedded electronic device into which a microprocessor, a ROM, and a RAM are integrated. The electronic control unit 10 is connected to the secondary battery 2, the fuel cell 3, the motor 4, the converter 6, the inverter 7, the on-board charger 8, and the control circuit 9 for mutually exchanging signals. The devices each transmit information on its operational mode to the electronic control unit 10. Specific examples of the information input to the electronic control unit 10 include the charging/discharging voltage and current of the secondary battery 2, the temperatures of the batteries, the rotational speeds of fans for cooling the batteries, the output voltage and current from the fuel cell 3, required output from the motor 4, and the external charging operation. On the basis of these information items, the electronic control unit 10 controls the operational modes of the devices.

3. Configuration of Control

With reference to FIG. 2, the electronic control unit 10 includes a remainder estimator 11, a power consumption estimator 12, a consumed time estimator 13, a target remaining-time estimator 14, a number estimator 15, and a controller 16. These elements may be electronic circuits (hardware), or may be incorporated into a program in the form of software. Alternatively, some of the functions of the elements may be provided in the form of hardware while the other may be provided in the form of software.

The remainder estimator 11 calculates the remaining number $N_{REM}$ of starts representing the remaining number of available starts of the fuel cell 3 (the desired or allowable number of starts of the fuel cell before the end of its use). The remaining number $N_{REM}$ of starts is calculated through subtraction of the cumulative number $N_{FCST}$ of starts (the number of actual starts of the fuel cell 3) from the allowable number $N_{LIFE}$ of starts over lifetime, for example, as shown in Expression 1. The allowable number $N_{LIFE}$ of starts over lifetime is determined based on the relationship between the number of starts and the power-generation performance of the fuel cell 3. The calculated remaining number $N_{REM}$ of starts is transmitted to the controller 16.

Figure 3:
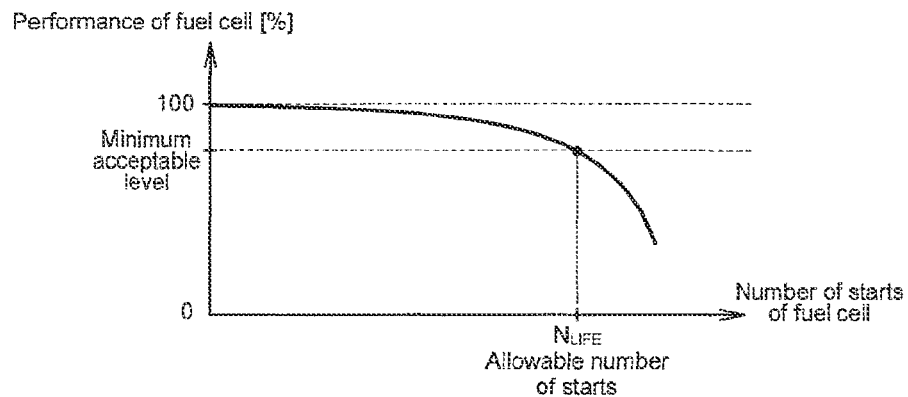
FIG. 3 is a graph illustrating the relationship between the performance and the number of starts of a fuel cell in a power controlling apparatus according to the embodiment.

The allowable number $N_{LIFE}$ of starts over lifetime may be a default value determined in advance, or may be determined based on the power-generation characteristics illustrated in FIG. 3. For example, the allowable number $N_{LIFE}$ of starts over lifetime is determined to be the number of starts corresponding to the minimum acceptable level (e.g., 70%) of the power-generation performance compared to that of an unused fuel cell. Alternatively, the minimum acceptable level may be designated by a user of the vehicle 20. The cumulative number $N_{FCST}$ of starts represents the number of the starts of the fuel cell 3 in the halt mode and is cumulatively counted. The cumulative number $N_{FCST}$ of starts does not include the number of the starts from the idling mode.

[Expression 1]

$$N_{REM} = N_{LIFE} - N_{FCST} \quad \text{(Expression 1)}$$

The power consumption estimator (consumption estimator) 12 estimates the power consumption rate $\Delta Q/dt$ of the vehicle 20 based on the actual operational conditions of the fuel cell 3. The power consumption rate $\Delta Q/dt$ represents power (energy) consumed from the secondary battery 2 in the vehicle 20 per unit time. The power consumption estimator 12 calculates the power consumption rate $\Delta Q/dt$ through division of the integrated value $\Sigma W$ of power consumed during a predetermined time $T_1$ by the predetermined time $T_1$. The predetermined time $T_1$ represents a period during the charge from the fuel cell 3 to the secondary battery 2. The estimated power consumption rate $\Delta Q/dt$ is transmitted to the consumed time estimator 13.

The power supplied to the motor 4 during the charge to the secondary battery 2 is equal to the difference of the power charged to the secondary battery 2 from the power generated by the fuel cell 3. The power consumption rate $\Delta Q/dt$ is represented by Expression 2, where $Q_{FCGEN}$ is power generated by the fuel cell 3 and $Q_{BC}$ is power charged to the secondary battery 2 during the predetermined time $T_1$. It is noted that k in Expression 2 is a correction factor determined in advance based on losses in the converter 6 and the inverter 7.

[Expression 2]

$$\Delta Q / dt = \frac{\sum_{t=0}^{T_1} W}{T_1} = \frac{k \cdot (Q_{FCGEN} - Q_{BC})}{T_1} \quad \text{(Expression 2)}$$

The consumed time estimator 13 estimates the time $T_2$ representing a period during which the power charged in the secondary battery 2 can keep driving the vehicle 20. The estimated time $T_2$ represents a period until the time to charge the secondary battery 2 (until the charging rate SOC reaches the minimum charging rate $SOC_{MIN}$) in the vehicle 20 running at the current pace. The estimated time $T_2$ is calculated through division of the total power $Q_B$ charged in the secondary battery 2 by the power consumption rate $\Delta Q/dt$. The total power $Q_B$ charged in the secondary battery 2 is calculated through subtraction of the minimum charged power $Q_{BLOW}$ corresponding to the minimum charging rate $SOC_{MIN}$ from the maximum charged power $Q_{BHIGH}$ corresponding to the maximum charging rate $SOC_{MAX}$ of the secondary battery 2, for example, as shown in Expression 3. A decrease in the power consumption rate $\Delta Q/dt$ leads to an increase in error in the estimated time $T_2$ due to an error in the power consumption rate $\Delta Q/dt$. Accordingly, the estimated time $T_2$ may preferably be limited by an upper limit (e.g., several tens of hours).

[Expression 3]

$$T_2 = \frac{Q_B}{\Delta Q / dt} = \frac{Q_{BHIGH} - Q_{BLOW}}{\Delta Q / dt} \quad \text{(Expression 3)}$$

The consumed time estimator 13 also measures a charging time $T_3$ representing a period for the previous charge from the fuel cell 3 to the secondary battery 2. In specific, the charging time $T_3$ is a period for an increase in the charging rate SOC of the secondary battery 2 from the minimum charging rate $SOC_{MIN}$ to the maximum charging rate $SOC_{MAX}$. If the predetermined time $T_1$ used in the calculation by the power consumption estimator 12 is equal to the charging time $T_3$, the charged power $Q_{BC}$ accords with the total charged power $Q_B$. The estimated time $T_2$ and the measured charging time $T_3$ are transmitted to the number estimator 15.

The target remaining-time estimator 14 estimates the remaining time $T_{REM}$ representing the remaining value of an available operating time of the fuel cell 3 (hours or years for available starts of the fuel cell, or hours or years until the end of its use). The remaining time $T_{REM}$ is estimated in view of years (hours) for the consumption of all the allowable number $N_{LIFE}$ of starts over lifetime used in the calculation by the remainder estimator 11. For example, the remaining time $T_{REM}$ represents years of owning the vehicle 20 (hours for the use of the vehicle 20) until the number of actual starts of the fuel cell 3 reaches the allowable number $N_{LIFE}$ of starts over lifetime, or years until the replacement of the fuel cell 3 (maintenance time for the fuel cell 3). The relationship between the remaining number $N_{REM}$ of starts and the estimated remaining time $T_{REM}$ is not necessarily constant and significantly varies depending on the usage of the vehicle 20. The remaining time $T_{REM}$ is thus estimated separately from the remaining number $N_{REM}$ of starts in this embodiment.

The remaining time $T_{REM}$ is determined based on the usage of the vehicle 20, such as a desired service life of the vehicle 20 (how many years the user will use the vehicle 20), or the target number of replacements of the fuel cell 3 (how many years later the user will replace the fuel cell 3). The target remaining-time estimator 14 calculates the remaining time $T_{REM}$ through subtraction of a cumulative driving time $\Sigma T_{VEHICLE}$ of the vehicle 20 from a service life $T_{LIFE}$ of the vehicle 20 (or the fuel cell 3) desired by the user, for example, as shown in Expression 4. The calculated remaining time $T_{REM}$ is transmitted to the number estimator 15.

[Expression 4]

$$T_{REM} = T_{LIFE} - \Sigma T_{VEHICLE} \quad \text{(Expression 4)}$$

The number estimator 15 estimates the number $N_{EST}$ of starts of the fuel cell 3 from the estimated time $T_2$ the charging time $T_3$, and the remaining time $T_{REM}$ calculated by the consumed time estimator 13 and the target remaining-time estimator 14. The estimated number $N_{EST}$ of starts represents the number of available starts of the fuel cell 3 within the remaining time $T_{REM}$ in the vehicle 20 running at the current pace. The estimated number $N_{EST}$ of starts is calculated through division of the remaining time $T_{REM}$ by the sum of the estimated time $T_2$ and the charging time $T_3$, for example, as shown in Expression 5. The estimated number $N_{EST}$ of starts is transmitted to the controller 16.

[Expression 5]

$$N_{EST} = \frac{T_{REM}}{T_2 + T_3} \quad \text{(Expression 5)}$$

The controller 16 controls the non-generating modes of the fuel cell 3 based on the comparison between the estimated number $N_{EST}$ of starts calculated by the number estimator 15 and the remaining number $N_{REM}$ of starts calculated by the remainder estimator 11. In specific, if the estimated number $N_{EST}$ of starts is equal to or smaller than the remaining number $N_{REM}$ of starts, the controller 16 determines that the remaining number $N_{REM}$ of starts will not reach zero within the remaining time $T_{REM}$ in the fuel cell 3 repeatedly started and stopped at the present frequency. The controller 16 thus selects the halt mode of the non-generating modes of the fuel cell 3. In this case, the fuel cell 3 generating no power is controlled to be the halt mode without fuel supply.

If the estimated number $N_{EST}$ of starts is larger than the remaining number $N_{REM}$ of starts, the controller 16 determines that the remaining number $N_{REM}$ of starts may reach zero within the remaining time $T_{REM}$, and selects the idling mode of the fuel cell 3. In this case, the fuel cell 3 generating no power is controlled to be the idling mode while being energized and supplied with fuel.

The controller 16 selects one of the non-generating modes of the fuel cell 3 upon or after the completion of the charge. For example, in the case of the calculations and determination during the charge or upon the completion of the charge, the fuel cell 3 can be controlled to be the idling mode simultaneously with the completion of the charge. In the case of the calculations and determination after the completion of the charge, the controller 16 may select the idling mode before the acquisition of the results of the determination, and then select one of the idling mode and the halt mode in response to the results of the determination. The control on the modes based on the results of the determination may preferably continue at least until the start of the subsequent charge from the fuel cell 3 to the secondary battery 2.

4. Operations

The calculation process for selecting a mode of the fuel cell 3 upon the completion of the charge to the secondary battery 2 will now be explained with reference to FIGS. 4(A) and 4(B).

When the charging rate SOC of the secondary battery 2 decreases to the minimum charging rate $SOC_{MIN}$ at a time $t_1$, the fuel cell 3 is started and generates power to be supplied to the secondary battery 2 and the motor 4. The remainder estimator 11 increments the cumulative number $N_{FCST}$ of starts by one, and calculates the remaining number $N_{REM}$ of starts through subtraction of the cumulative number $N_{FCST}$ of starts from the allowable number $N_{LIFE}$ of starts over lifetime. The consumed time estimator 13 starts measuring a charging time $T_3$. The target remaining-time estimator 14 determines a cumulative driving time $\Sigma T_{VEHICLE}$ of the vehicle 20 until the current time, and calculates the remaining time $T_{REM}$ through subtraction of the cumulative driving time $\Sigma T_{VEHICLE}$ from the service life $T_{LIFE}$.

Figure 4A:
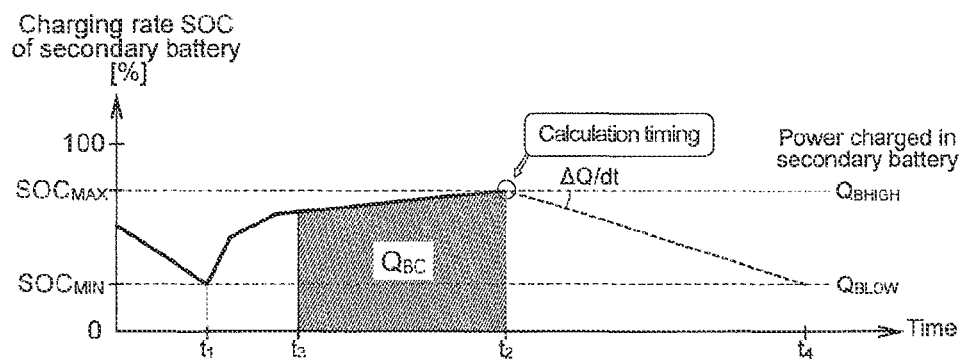
FIG. 4(A) illustrates a variation in the charging rate of a secondary battery.
Figure 4B:
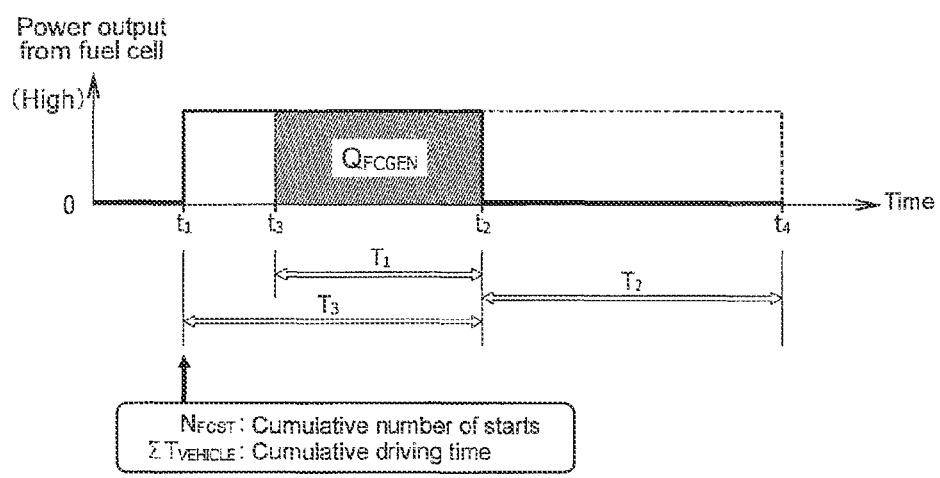
FIG. 4(B) illustrates a variation in power generated by a fuel cell.

With reference to FIG. 4(A), although the power charged to the secondary battery 2 varies depending on the load on the motor 4, the charging rate SOC of the secondary battery 2 gradually increases with time. During the charge, the power consumption estimator 12 measures power $Q_{FCGEN}/dt$ generated by the fuel cell 3 per unit time and power $Q_{BC}/dt$ charged to the secondary battery 2 per unit time, and stores the results in a memory or storage unit (not shown).

When the charging rate SOC of the secondary battery 2 reaches the maximum charging rate $SOC_{MAX}$ at a time $t_2$, the fuel cell 3 stops power generation. The power consumption estimator 12 calculates a time $t_3$ a predetermined time $T_1$ before the time $t_2$ of the completion of the charge, and calculates the power $Q_{BC}$ charged to the secondary battery 2 and the power $Q_{FCGEN}$ generated by the fuel cell 3 from the time $t_3$ to the time $t_2$. The power consumption estimator 12 then calculates the power consumption rate $\Delta Q/dt$ during the predetermined time $T_1$, for example, based on Expression 2.

The consumed time estimator 13 estimates the time $T_2$ from the end of the charging time $T_3$ to the time of exhaustion of the power in the secondary battery 2 in the vehicle 20 running at the power consumption rate $\Delta Q/dt$. In other words, the consumed time estimator 13 calculates a period until a time $t_4$ of the subsequent charge to the secondary battery 2. If the maximum charging rate $SOC_{MAX}$ and the minimum charging rate $SOC_{MIN}$ are determined, the maximum charged power $Q_{BHIGH}$ and the minimum charged power $Q_{BLOW}$ can be preliminarily calculated during the charge based on the charging/discharging characteristics of the secondary battery 2.

The number estimator 15 estimates the number $N_{EST}$ of starts from the calculated remaining time $T_{REM}$, estimated time $T_2$, and charging time $T_3$ obtained by the above estimation. The controller 16 then compares the estimated number $N_{EST}$ of starts with the remaining number $N_{REM}$ of starts. The controller 16 controls the fuel cell 3 to be the idling mode if $N_{EST}$ is larger than $N_{REM}$, and the halt mode if $N_{EST}$ is equal to or smaller than $N_{REM}$.

5. Advantageous Effects (1) The power controlling apparatus 1 controls the fuel cell 3 generating no power to be the idling mode or the halt mode based on the calculated remaining number $N_{REM}$ of starts. In the idling mode, the power source for the related accessories attached to the fuel cell 3, for example, remains in the ON state and thus continues consuming slight power from the secondary battery 2. The continuous idling mode, however, can prevent the increases in the electrode potential caused by the switching between the start and stop of the fuel cell 3, and thus can prevent the corrosion of carbon carriers such as carbon black, for example. The conditions of the carriers are thus improved, so that the metal catalyst is barely coarsened, resulting in effective prevention of the deterioration of the fuel cell 3. This configuration can ensure the allowable number $N_{LIFE}$ of starts over lifetime of the fuel cell 3 within the service life $T_{LIFE}$ of the vehicle 20.

If the allowable number $N_{LIFE}$ of starts over lifetime can be ensured within the service life $T_{LIFE}$ regardless of the stop of the fuel cell 3 at this time, the fuel cell 3 is controlled to be the halt mode. This control can reduce the power consumption compared to the idling mode, and thus can increase the running distance of the vehicle 20.

The power controlling apparatus 1 thus can achieve enhanced energy efficiency of the secondary battery 2 without deterioration of the fuel cell 3.

(2) The power controlling apparatus 1 controls the fuel cell 3 based on the power consumption rate $\Delta Q/dt$ representing the estimated consumption rate of electrical energy in the motor 4 of the vehicle 20. In other words, the power controlling apparatus 1 can control the non-generating modes of the fuel cell 3 in view of the energy consumption rate in the vehicle 20 and in response to the intensity and frequency to prevent the deterioration of the fuel cell 3 controlled under the actual operational conditions of the vehicle 20. For example, a vehicle 20 owned by a user driving calmly without sudden acceleration or deceleration tends to have a relatively long estimated time $T_2$, so that the estimated number $N_{EST}$ of starts is readily underestimated. This control can cause the halt mode of the fuel cell 3 generating no power and enhance the electricity efficiency, as long as the remaining number $N_{REM}$ of starts is ensured.

(3) The power controlling apparatus 1 estimates the power consumption rate $\Delta Q/dt$ from the power $Q_{BC}$ charged to the secondary battery 2 and the power $Q_{FCGEN}$ generated by the fuel cell 3. Through the control on the non-generating modes based on the power consumption rate $\Delta Q/dt$ upon the completion of the charge, the power controlling apparatus 1 can accurately evaluate the remaining number $N_{REM}$ of starts and the remaining time $T_{REM}$ of the fuel cell 3 upon the completion of the charge. In other words, the power controlling apparatus 1 can select an appropriate non-generating mode immediately after the power generation by the fuel cell 3 becomes unnecessary, and can minimize the energy consumption in the halt mode.

The use of the charged power $Q_{BC}$ and the generated power $Q_{FCGEN}$ in the actual charging control leads to accurate estimation of the power consumption rate $\Delta Q/dt$ without effects of a decrease in the power generation efficiency of the fuel cell 3 or a decrease in the chargeability of the secondary battery 2. The reliability of the control can thus be improved.

(4) The power controlling apparatus 1 controls the fuel cell 3 based on the magnitude relationship between the estimated number $N_{EST}$ of starts and the remaining number $N_{REM}$ of starts. This control can quantitatively evaluate the deterioration conditions of the fuel cell 3 and can improve the controllability. In addition, the control can almost certainly ensure the remaining number $N_{REM}$ of starts of the fuel cell 3 and clearly inform a user of the timing for replacement of the fuel cell 3 to improve the usability.

(5) The power controlling apparatus 1 selects one of the idling mode and the halt mode and maintains the selected mode until the start of the subsequent charge. This control can certainly ensure the remaining number $N_{EST}$ of starts of the fuel cell 3 to prevent the deterioration of the fuel cell 3 in the idling mode. Furthermore, the control can minimize the energy consumption to enhance the electricity efficiency in the halt mode.

6. Modifications

The invention should not be construed to be limited to the above-described embodiments and may be modified in various manners without departing from the gist. The individual features of the embodiments may be selectively employed as necessary or properly combined with one another.

For example, the power controlling apparatus 1 may also be applied to a hybrid vehicle including an engine and a motor 4 for driving the vehicle 20. The above-explained control can be executed by any vehicle 20 including at least a secondary battery 2 for driving the motor 4 and a fuel cell 3 for charging the secondary battery 2.

The apparatus according to the embodiments includes the secondary battery 2 and the fuel cell 3 for supplying power to the motor 4. Alternatively, the batteries may supply power to any other electrical device driven by electricity.

In the above-described embodiments, the remainder estimator 11 estimates the remaining number $N_{REM}$ of starts from the cumulative number $N_{FCST}$ of starts. Alternatively, the remainder estimator 11 may correct the estimated remaining number $N_{REM}$ of starts based on the cumulative number $N_{FCST}$ of starts, a cumulative time of power generation, and the temperature of the fuel cell. This calculation process can improve the accuracy of the estimation of the remaining number $N_{REM}$ of starts.

Although a single secondary battery 2 is used in the embodiments, two or more secondary batteries 2 may also be used. For example, the control may execute the calculation during the charge from the fuel cell 3 to any one of the secondary batteries 2, and select one of the non-generating modes upon the completion of the charge. In this case, the selected non-generating mode is maintained until the start of the subsequent charge to another secondary battery 2.

REFERENCE SIGNS LIST 1 power controlling apparatus
2 secondary battery
3 fuel cell
4 motor (electrical device)
5 fuel tank
6 converter
7 inverter
8 on-board charger 9 control circuit
10 electronic control unit
11 remainder estimator
12 power consumption estimator (consumption estimator)
13 consumed time estimator
14 target remaining-time estimator
15 number estimator
16 controller
20 vehicle

The invention claimed is:

1. A power controlling apparatus comprising:
a secondary battery connected to an electrical device;
a fuel cell connected to the electrical device and the secondary battery, the fuel cell having two non-generating modes comprising an idling mode, during which generation of power is suspended while being supplied with fuel, and a halt mode, during which generation of power is completely stopped without fuel supply;
a processor and a memory storing a program executed by the processor, the processor configured to:
calculate, as a remainder estimator, a remaining number of starts representing the remaining number of available starts of the fuel cell; and
control, as a controller, the fuel cell to be one of the two non-generating modes during a non-charging mode of the secondary battery, based on the remaining number of starts calculated by the remainder estimator.

2. The power controlling apparatus according to claim 1, wherein
the processor is further configured to calculate, as a consumption estimator, a power consumption rate in the secondary battery by the electrical device, wherein
the controller selects one of the two non-generating modes based on the remaining number of starts and the power consumption rate.

3. The power controlling apparatus according to claim 2, wherein
the consumption estimator calculates the power consumption rate, based on power charged to the secondary battery and power generated by the fuel cell during the charge to the secondary battery, and
the controller controls the fuel cell to be one of the two non-generating modes upon completion of the charge to the secondary battery.

4. The power controlling apparatus according to claim 2, wherein
the processor is further configured to estimate, as a number estimator, the number of starts of the fuel cell available within a remaining time, based on the power consumption rate, the remaining time representing the remaining value of an available operating time in the fuel cell, wherein
the controller controls the fuel cell to be
the idling mode of the two non-generating modes if the estimated number of starts is larger than the remaining number of starts, and
the halt mode of the two non-generating modes if the estimated number of starts is equal to or smaller than the remaining number of starts.

5. The power controlling apparatus according to claim 3, wherein
the processor is further configured to estimate, as a number estimator, the number of starts of the fuel cell available within a remaining time, based on the power consumption rate, the remaining time representing the remaining value of an available operating time in the fuel cell, wherein
the controller controls the fuel cell to be
the idling mode of the two non-generating modes if the estimated number of starts is larger than the remaining number of starts, and
the halt mode of the two non-generating modes if the estimated number of starts is equal to or smaller than the remaining number of starts.

6. The power controlling apparatus according to claim 1, wherein the controller maintains the fuel cell in the one of the two non-generating modes until start of subsequent charge to the secondary battery.

\* \* \* \* \*